US 8,126,984 B2

(12) United States Patent
Vogler et al.

(10) Patent No.: US 8,126,984 B2
(45) Date of Patent: Feb. 28, 2012

(54) MULTIDIMENSIONAL APPROACH TO CONTEXT-AWARENESS

(75) Inventors: Hartmut K. Vogler, San Mateo, CA (US); Kevin Goslar, Dresden (DE)

(73) Assignee: SAP Aktiengesellschaft, Walldorf (DE)

( * ) Notice: Subject to any disclaimer, the term of this patent is extended or adjusted under 35 U.S.C. 154(b) by 21 days.

(21) Appl. No.: 12/210,493

(22) Filed: Sep. 15, 2008

(65) Prior Publication Data
US 2009/0013038 A1 Jan. 8, 2009

Related U.S. Application Data (63) Continuation of application No. 10/457,010, filed on Jun. 9, 2003, now abandoned.

(60) Provisional application No. 60/388,289, filed on Jun. 14, 2002, provisional application No. 60/422,112, filed on Oct. 30, 2002.

(51) Int. Cl.
G06F 15/16 (2006.01)
(52) U.S. Cl. ........ 709/217; 709/218; 709/219; 709/203; 715/231
(58) Field of Classification Search .................. 709/203, 709/217, 223, 233, 218, 219; 345/762; 715/231
See application file for complete search history.

(56) References Cited

U.S. PATENT DOCUMENTS

| | | | |
|---|---|---|---|
| 5,799,292 A | 8/1998 | Hekmatpour | |
| 5,930,699 A | 7/1999 | Bhatia | |
| 5,948,040 A | 9/1999 | Delorme et al. | |
| 6,026,375 A | 2/2000 | Hall et al. | |
| 6,049,711 A | 4/2000 | Ben-Yehezkel et al. | |
| 6,088,594 A | 7/2000 | Kingdon et al. | |
| 6,199,099 B1 | 3/2001 | Gershman et al. | |
| 6,236,978 B1 | 5/2001 | Tuzhilin | |
| 6,239,978 B1 | 5/2001 | Liao | |
| 6,260,035 B1 | 7/2001 | Rommelse et al. | |
| 2001/0018349 A1 | 8/2001 | Kinnunen et al. | |
| 2002/0045456 A1 | 4/2002 | Obradovich | |
| 2002/0101448 A1* | 8/2002 | Sanderson | 345/762 |

(Continued)

FOREIGN PATENT DOCUMENTS
EP 0 323 381 7/1989
(Continued)

OTHER PUBLICATIONS

"Adaptive User Interfaces Class 8113d, Fall 94," http://www.cc.gatech.edu/computing/classes/cs8113d_94_fall/homepage.html, printed from the Internet Nov. 15, 2002, 5 pgs.

(Continued)

Primary Examiner — Djenane Bayard
(74) Attorney, Agent, or Firm — Fish & Richardson P.C.

(57) ABSTRACT

A context aware enterprise system includes a network, an enterprise service coupled to the network, and a plurality of information sources that include enterprise information related to one or more activities of the enterprise system. The enterprise system also includes a plurality of clients with user interfaces by which a user may access the enterprise service over the network. A context determination service determines context information describing a multi-dimensional context based on the enterprise information. The context information determined by the context determination service includes a user identification, an identification of a client selected by the user, a user role, a user expertise related to the enterprise service, and a user expertise related to the selected client. Based on the context information, an interface adaptation service adapts the user interface of the client.

20 Claims, 7 Drawing Sheets

U.S. PATENT DOCUMENTS

| | | | |
|---|---|---|---|
| 2003/0046401 A1* | 3/2003 | Abbott et al. | 709/228 |
| 2003/0090515 A1 | 5/2003 | Chang et al. | |
| 2003/0144846 A1 | 7/2003 | Denenberg et al. | |
| 2003/0182394 A1* | 9/2003 | Ryngler et al. | 709/217 |
| 2003/0208459 A1 | 11/2003 | Shea et al. | |
| 2006/0200260 A1 | 9/2006 | Hoffberg et al. | |

FOREIGN PATENT DOCUMENTS

| | | |
|---|---|---|
| EP | 0367 709 | 5/1990 |
| WO | WO0169387 | 9/2001 |

OTHER PUBLICATIONS

Benyon, David, "Accommodating Individual Differences Through an Adaptive User Interface," http://www.dcs.napier.ac.uk/~dbenyon/inddiff.pdf, undated, printed from the Internet Jan. 16, 2004, 16 pgs.

Cooper, Greg, et al., "Conceptual Design of Goal Understanding Systems: Investigation of Temporal Reasoning Under Uncertainty," http://www.research.microsoft.com/users/horvitz/goal.htm, undated, printed from the Internet Nov. 15, 2002, 2 pgs.

Dey, Anind K., "Understanding and Using Context," Personal and Ubiquitous Computing Journal, vol. 5 (1), pp. 4-7.

"Genie Agent Architecture," http://www.pbol.org/projects/genie/images/other/genarc.gif, undated, printed from the Internet Nov. 15, 2002, 1 pg.

"Genie Architecture Phase 1," http://www.pbol.org/projects/genie/images/other/Ark_vaihe1.gif, undated, printed from the Internet Nov. 15, 2002, 1 pg.

"Genie Architecture Phase 2," http://www.pbol.org/projects/genie/images/other/Ark_vaihe2C.gif, undated, printed from the Internet Nov. 15, 2002, 1 pg.

"Genie Architecture Phase 3," http://www.pbol.org/projects/genie/images/other/Ark_vaihe3.gif, undated, printed from the Internet Nov. 15, 2002, 1 pg.

"Genie of the Net: Adaptive User Interface," http://www.iie.fi/genie/en/mukautuva_kj.html, undated, printed from the Internet Nov. 15, 2002, 1 pg.

"Genie of the Net: Context Recognition," http://www.pbol.org/projects/genie/?view=etusivu&sub=kontekstin_tunnistaminen&lang=en, undated, printed from the Internet Nov. 15, 2002, 1 pg.

"Genie of the Net: Genie Agent Platform," http://www.pbol.org/projects/genie/?view=etusivu&sub=henri&lang=en, undated, printed from the Internet Nov. 15, 2002, 2 pgs.

"Genie of the Net: Genie System Architecture," http://www.pbol.org/projects/genie/?view=etusivu&sub=arkkitehtuuri&lang=en,.undated, printed from the Internet Nov. 15, 2002, 2 pgs.

"Genie of the Net: Identification System," http://www.pbol.org/projects/genie/?view=etusivu&sub=tomi&lang=en, undated, printed from the Internet Nov. 15, 2002, 2 pgs.

"Genie of the Net: Information Service Module," http://www.pbol.org/projects/genie/?view=etusivu&sub=ilkka&lang=en, undated, printed from the Internet Nov. 15, 2002, 2 pgs.

Goslar, Kevin, et al., "A Multidimensional Approach to Context-Awareness," Proceedings of the 7th World Multiconference on Systemics, Cybernetics and Informatics (SCI 2003), Orlando, FL, USA, Jul. 27-30, 2003, 6 pgs.

Horvitz, Eric, "Lumiere Project: Bayesian Reasoning for Automated Assistance," http://www.research.microsoft.com/users/horvitz/lum.htm, undated, printed from the Internet Nov. 15, 2002, 7 pgs.

Penner, Robert R., Ph.D., et al., "DIGBE: Adaptive User Interface Automation," http://newatlantis.isle.org/~aui/papers/RPenner00.pdf, undated, printed from the Internet Jan. 16, 2004, 4 pgs.

Riekki, Jukka, et al. "Genie of the Net: Context-Aware Information Management," http://www.pbol.org/projects/genie/publications/infomanage.pdf, undated, printed from the Internet Jan. 16, 2004, 13 pgs.

Yamada, Seiji, et al., "Adaptive User Interface of a Web Search Engine by Organizing Page Information Agents," http://www.iuiconf.org/02pdf/2002-002-0024.pdf, 2002 International Conference on Intelligent User Interfaces, undated, printed from the Internet Jan. 16, 2004, 6 pgs.

Yamada, Seiji, et al., "Adaptive User Interface of a Web Search Engine by Organizing Page Information Agents," http://www.iuiconf.org/02presentations/2002-007-0024,pdf, 2002 International Conference on Intelligent User Interfaces, undated, printed from the Internet Jan. 16, 2004, 28 pgs.

* cited by examiner

| | | |
|---|---|---|
| USER IDENTIFICATION | EMPLOYEE NUMBER 14999:DAVID DUDLEY:52 YRS | 605 |
| CLIENT IDENTIFICATION | SERIAL NUMBER 43972:BRAINFLEX MODEL 32xi (A VOICE CAPABLE PDA) | 610 |
| USER ROLE | EMPLOYEE:DELIVERY TRUCK DRIVER (LONG HAUL):DELIVERY TO ALASKA PIPELINE SERVICE CO. (FAIRBANKS, ALASKA) | 615 |
| PHYSICAL ENVIRONMENT | LOCATION | NORTH AMERICA:ALASKA:RT 3 (5 MILES FROM FAIRBANKS):TRUCK 103:MOVING (TOWARDS FAIRBANKS) | 622 |
| | TIME | JANUARY 5, 2003:(2:30pm) | 624 |
| | NOISE LEVEL | MODERATE | 626 |
| EXPERTISE (ENTERPRISE SERVICE) | SUBSTANTIAL | 630 |
| EXPERTISE (CLIENT) | MODEST | 635 |
| HELP HISTORY | PASSIVE RECEPTION | 640 |
| PHYSICAL CONSTRAINTS OF USER | NONE | 645 |

FIG. 6A

| | | |
|---|---|---|
| CONTENT PRESENTED | SHIPPING TASKS OF DAVID DUDLEY (1/5/03 TO 1/8/03) | 655 |
| PRIMARY INTERFACE PATH | VOICE (VOICE-XML) | 660 |
| HELP LEVEL (ENTERPRISE SERVICE) | LOW | 665 |
| HELP LEVEL (CLIENT) | MODERATE TO HIGH | 670 |
| HELP STYLE | PROACTIVE | 675 |

MULTIDIMENSIONAL APPROACH TO CONTEXT-AWARENESS

CROSS-REFERENCE TO RELATED APPLICATIONS

This application is a continuation application of and claims priority to U.S. application Ser. No. 10/457,010, filed on Jun. 9, 2003, which claims priority to U.S. Provisional Application Nos. 60/388,289, filed Jun. 14, 2002, and 60/422,112, filed Oct. 30, 2002, each titled MULTIDIMENSIONAL APPROACH TO CONTEXT-AWARENESS. The disclosures of the prior applications are considered part of and are incorporated by reference in the disclosure of this application in their entirety.

TECHNICAL FIELD

This invention relates to the use of context information by computing applications.

BACKGROUND

An enterprise resource planning (ERP) system includes various business-related enterprise services. The ERP system provides an organization-wide information handling infrastructure to control the business processes of a company. The ERP system and the enterprise services that it includes may be extremely complex and the company may depend on their correct operation.

Many employees of the company may use the enterprise services of the ERP system through a variety of client devices. For example, an accountant may access the ERP system on a desktop computer to update financial records of the company. The chief executive officer (CEO), on the other hand, may use a laptop computer to obtain a strategic overview of company performance from the ERP system. In turn, a delivery driver may access the ERP system using a personal digital assistant (PDA) to determine a delivery schedule. Each also might use the ERP system to inquire about the status of their employee benefits from home, for example, using a phone. In sum many employees may access the ERP system, and each may do so in a variety of contexts.

Employees of the company may have difficulty using the ERP system because of the system's complexity and the many contexts in which it may be used. Even when employees develop expertise in the ERP system, they may find that the system is ill-adapted to the particular context of their use.

SUMMARY

In one general aspect, an enterprise system with multi-dimensional context awareness includes a network, an enterprise service coupled to the network, and a plurality of information sources that include enterprise information related to one or more activities of the enterprise system. The enterprise system also includes a plurality of differing clients with user interfaces by which a user may access the enterprise service over the network. The clients may or may not be wireless. A context determination service determines context information describing a multi-dimensional context based on the enterprise information. The context information determined by the context determination service includes a user identification, an identification of the client selected by the user, a user role, a user expertise related to the enterprise service, and a user expertise related to the client selected by the user. Based on the context information, an interface adaptation service adapts the user interface of the selected client.

Implementations may include one or more of the following features. For example, adapting the user interface of the selected client may include selecting a sensory communication path for the interaction of the user with the enterprise service that is suited to a context described by the context information. The sensory communication path selected may include, for example, a voice communication path, a text communication path, or a graphical communication path.

The interface also may be adapted to adjust a level of help automatically provided to the user regarding operation of the selected client or the enterprise service. The level of help may be adjusted based on the context information describing the user expertise related to the selected client or the enterprise service, respectively. Adaptation also may include adapting the user interface to present only information to the user relevant to the role or identification of the user described by the context information.

To determine context information, the context determination service may include a rule engine or an inference engine.

The sources of the enterprise information accessed by the context determination service include databases, enterprise security devices, and location determining devices. Nevertheless, in a further implementation, the information sources include no information source configured only to provide context information.

The context information that the context determination service determines may further include a measure of time, or information regarding a physical environment of the user. The physical environment information may include information related to a location of the user, an activity of the user, a measure of background noise, or a measure of lightness or darkness.

To adapt the user interface based on the context information, the interface adaptation service also may include a rule engine, and/or an inference engine.

The inference engines of the context determination service and the interface adaptation service may employ, for example, Bayesian reasoning, the Dempster-Shafer theory, a knowledge base, an expert system, plan recognition, collaborative filtering, statistical analysis, a neural network, data mining, keyword analysis, fuzzy logic, an overlay model, a bug library, or a combination of one or more of these methods or systems.

These general and specific aspects may be implemented using a method, a system, or a computer program, or any combination of systems, methods, and computer programs.

Other features will be apparent from the following description, including the drawings, and from the claims.

DESCRIPTION OF DRAWINGS

Like reference symbols in the various drawings indicate like elements.

DETAILED DESCRIPTION

Figure 1:
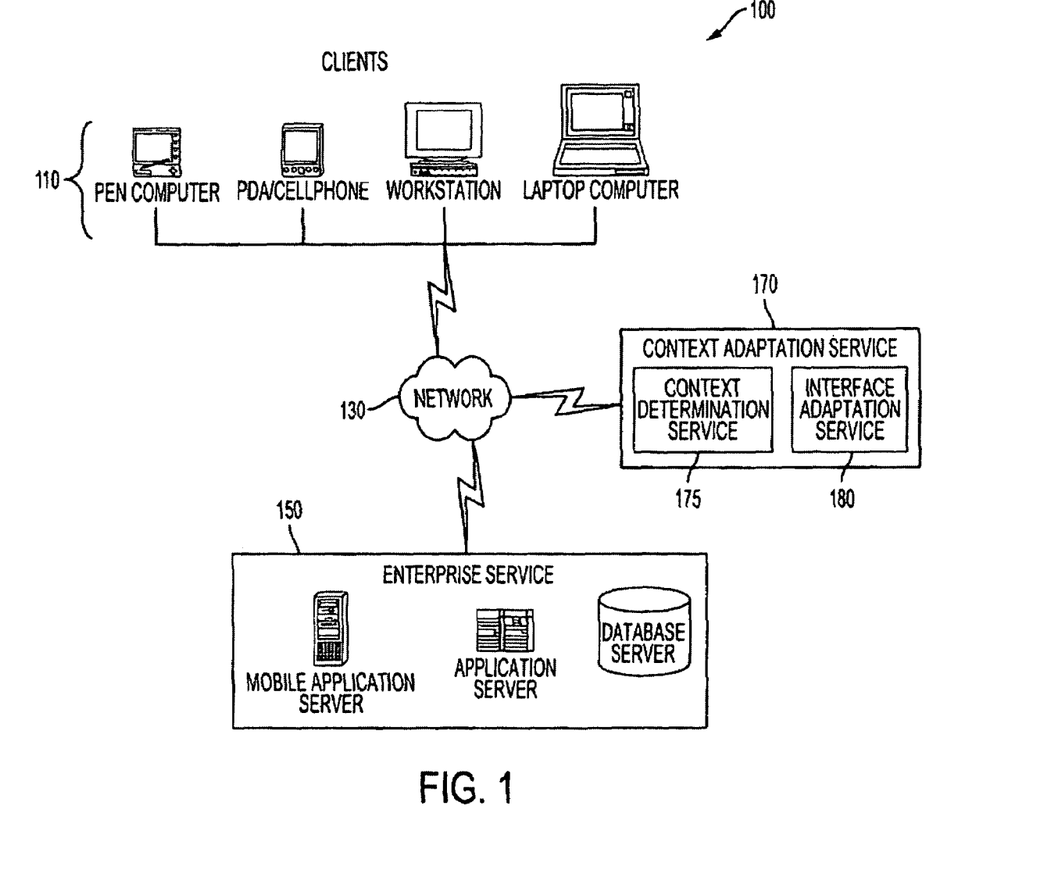
FIG. 1 is a is a schematic diagram of an enterprise system that configures a client interface using a context adaptation service.

Referring to FIG. 1, a generalized enterprise system 100 may be used to configure a user interface of a client to facilitate a user's access to an enterprise service based upon a multi-dimensional context (i.e., a context described by more than one parameter) of the user's use. The multi-dimensional context includes, for example, an identification of the user and of the client, a role of the user, expertise of the user relative to the enterprise service and relative to the client. Exemplary components of the enterprise system 100 are described in greater detail below.

The enterprise system 100 of FIG. 1 generally includes one or more clients 110, a network 130, an enterprise service 150, and a context adaptation service 170. The clients 110 generally may include any device, system, and/or piece of code that relies on another service to perform an operation. For example, the clients 110 may include a workstation, a notebook computer, a pen based computer, a personal digital assistant (PDA) or cellular telephone. The clients 110 also may include a web browser, an email client, a synchronization client (e.g., a calendar synchronization client, a task list synchronization client), an instant messaging (IM) client, a business productivity application (e.g., a word processor, a spreadsheet), and/or an operating system or operating system kernel. The clients 110 may access data or services provided by the enterprise service 150 by communicating with the enterprise service 150 using voice and/or non-voice data.

The enterprise service 150 generally may include, for example, any device, system, and/or piece of code configured to perform an operation requested by a client 110 (e.g., a cellular telephone, a web browser, or other service). For example, the enterprise service 150 may include an ERP service, an email service, an accounting service, a resource management service, a synchronization service (e.g., a calendar synchronization service, a task list synchronization service), a print service, a file access service, an IM service, an operating system, an operating system kernel, an authentication service, an authorization service, and/or any combination of these or other services.

The context adaptation service 170 generally may include, for example, any device, system, and/or piece of code configured to determine a users multi-dimensional context and adapt an interaction of the enterprise system with the user based on that context. For example, the context adaptation service 170 may include a context determination service 175, and an interface adaptation service 180. The services 175, 180 and the context adaptation service 170 may include a database access service, a sensor data access service, a rule engine, an inference engine (e.g., a Bayesian reasoning engine, a Dempster-Shafer engine, a probabilistic reasoning engine), a file access service, an operating system, an operating system kernel, and/or any combination of these services. The context adaptation service 170 may or may not be included in the enterprise service 150.

Communication between the clients 110 and the enterprise service 150 as well as other communications within the enterprise system services generally occur over a communications network 130. The communication network 130 typically allows direct or indirect communication between the system services (e.g., between the client 110, the enterprise service 150, and the context adaptation service 170), irrespective of physical or logical separation. The communication network 130 may include a secured communication network (e.g., a communication network protected by a firewall and/or other security mechanisms).

The communication network 130 may further include various mechanisms for delivering voice and/or non-voice data, such as, for example, the transport connection protocol (TCP), the Internet protocol (IP), the World Wide Web, one or more local area networks (LANs) and/or one or more wide area networks (WANs). The communication network 130 also may include analog or digital wired and wireless telephone networks, e.g., public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying voice or non-voice data.

One or more other services may be included in the components of enterprise system 100 and/or these components (hereinafter the system services) may be included as part of one or more other services. For example, the system services may include or be included in a general-purpose or a special-purpose computer (e.g., a personal computer, a personal digital assistant (PDAs), or a device specifically programmed to perform certain tasks), at least one Local Area Network (LAN), and/or at least one Wide Area Network (WAN). Either way, the response to and execution of instructions received by any or all of the system services may be controlled by, for example, a program, a piece of code, an instruction, a device, a computer system, or a combination thereof, for independently or collectively instructing the services to interact and operate as described herein.

Figure 2:
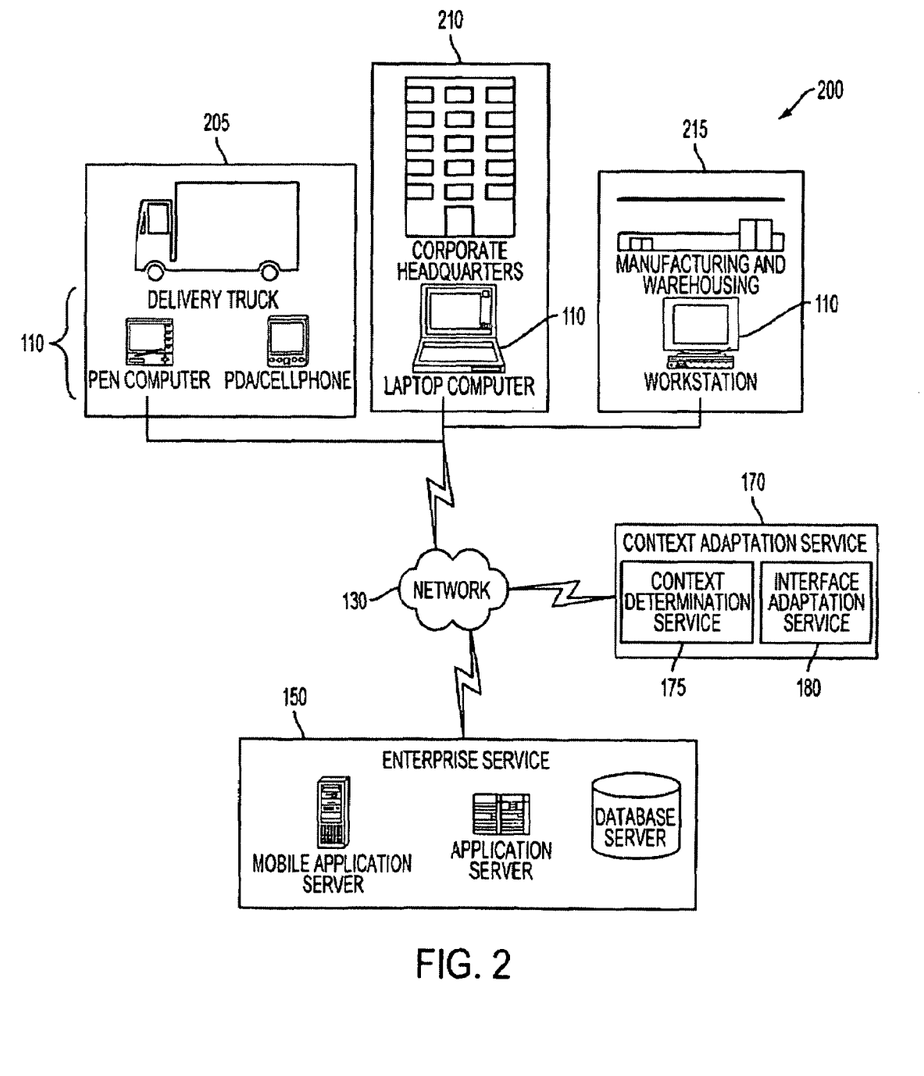
FIG. 2 is a schematic diagram of an enterprise system, as in FIG. 1, that illustrates several multi-dimensional contexts.

FIG. 2 shows an enterprise system 200, generally similar to enterprise system 100 of FIG. 1, illustrating several multi-dimensional contexts 205, 210, 215 in which a company employee may access the enterprise service 150 using a client 110. For example, company employees may include a delivery truck driver (context 205), a corporate executive (context 210), and a manufacturing manager (context 215). The responsibilities of each employee differ greatly as well as the information and services that their jobs require the enterprise service 150 to provide them. As with their responsibilities, the training and experience of the employees may differ dramatically. Moreover, the physical environments under which each employee accesses the enterprise service may differ greatly, both from access to access and from employee to employee.

More specifically, the delivery driver uses a mobile client (e.g., a pen computer, a PDA, a cellular telephone) to access, for example, delivery lists, addresses, and schedules maintained by the enterprise service 150. The delivery driver may use the mobile client to access the enterprise service 150, for example, from the delivery truck, or at a pick-up or delivery site. Moreover, the delivery driver may wish to verify delivery information while driving the delivery truck. Depending on time, season, and delivery point, ambient conditions such as lighting, temperature, and noise may vary greatly and may further complicate the task of accessing the enterprise service 150 using the client.

The corporate executive may access the enterprise service 150, for example, to obtain data showing corporate performance, or reflecting strategic relationships with other companies. The corporate executive may use a laptop computer or other client 110 to access the enterprise service 150 from an office in a corporate headquarters, from a corporate boardroom during a meeting, or while traveling (e.g., in an airplane or at a hotel). The privacy and security with which the corporate executive may access the enterprise service 150 may substantially influence the corporate executive's ability to use the enterprise service 150 in certain situations (e.g., while at an on-site meeting with a customer or competitor, or while traveling on a plane).

The manufacturing manager may access the enterprise service 150 to determine order status, manufacturing schedules, or work schedules. The manufacturing manager may use a workstation or other client device to access the enterprise service 150 from the manufacturing floor. Conditions on the manufacturing floor may be loud or may require silence, lighting conditions may vary, and there may be many spurious audible and visual distractions. Certain clothing or protective gear may be required (e.g., a cleansuit, a respirator, ear protection, eye protection), and may or may not interfere with using the client 110 to access the enterprise service 150.

Figure 3:
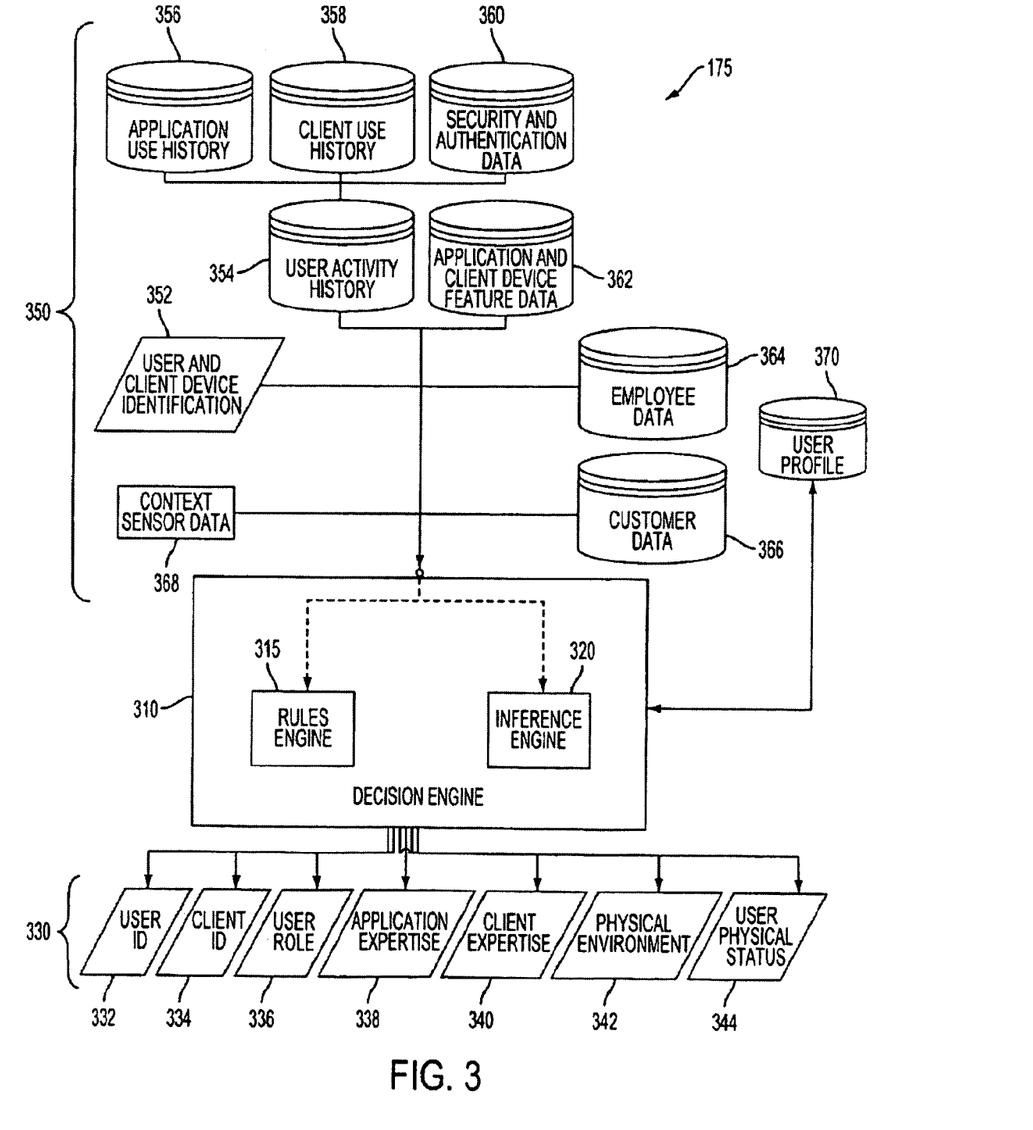
FIGS. 3-4 are schematic diagrams illustrating systems that may be used to implement the context adaptation service of FIGS. 1 and 2.
Figure 4:
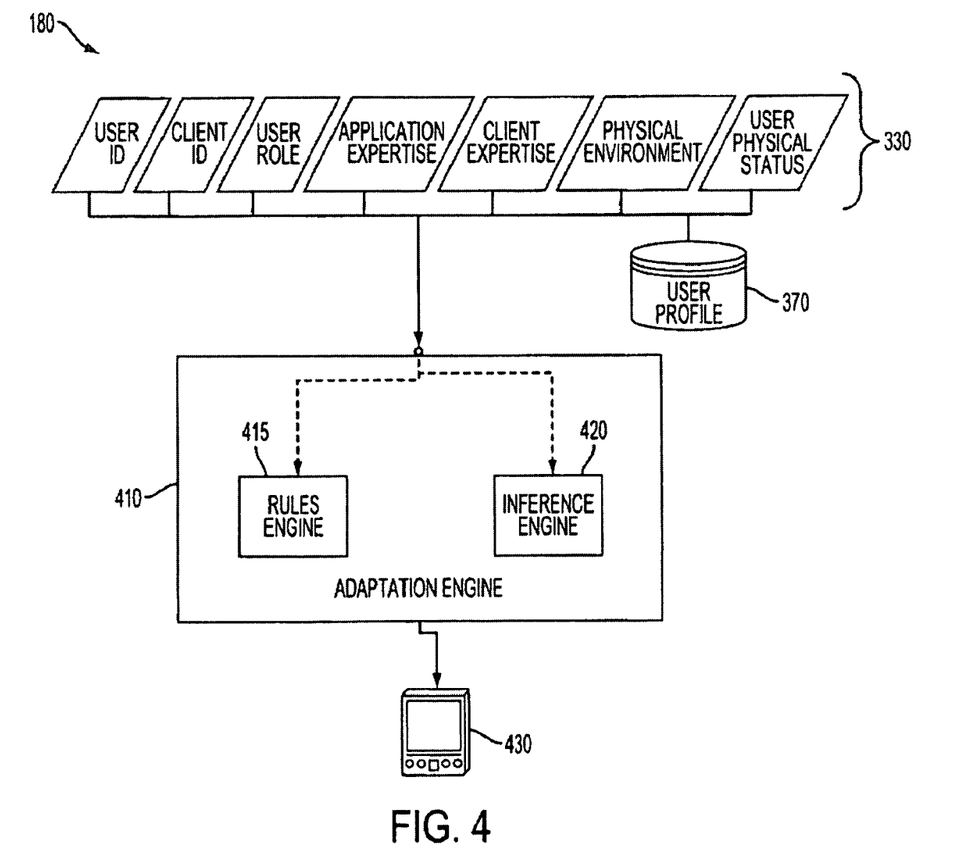

FIGS. 3 and 4 describe systems that may be used to implement the context determination service 175 and the interface adaptation service 180, respectively, of FIGS. 1 and 2.

Referring to FIG. 3, some implementations of the context determination service 175 include a decision engine 310 used to determine context information 330 from enterprise information 350. In this implementation, the enterprise information 350 includes a user identification and a client device identification 352.

The enterprise information also may include an activity history 354 of the enterprise service users. The activity history 354 may include, for example, an application use history 356 that shows details of user's past use of the enterprise service. For each enterprise user, the application use history 356 might show, for example, a frequency of access to the enterprise service, a frequency of access to help procedures of the enterprise services and a nature or timing of the help requested, and/or a frequency of functions performed using the enterprise service. The user activity history 354 also may include a client use history 358 showing, for each enterprise user, clients used to access the enterprise service and a frequency that those clients have been used. In addition, the user activity history 354 may include security and authentication data 360 related to the current and past security status and privileges of enterprise service users. The security and authentication data 360 also may include information regarding when and where secure resources were accessed. For example, the security and authentication data 360 may record that a user entered a building through a secured door at 7:30 am on a Monday morning.

The enterprise information 350 also may include information 362 that indicates current and past characteristics and features of the enterprise service and clients. The application and client feature data 362 may include, for example, information that a new capability has been added to a newly released version of the enterprise service, or that a PDA client may be voice enabled while a pen based computer client may not.

Also included in the enterprise information 350 are general employee data 364 and customer date 366. For each employee, the employee data 364 may include information such as the role, job title, job description, or job location of the employee. This information may describe the workplace, permissions, restrictions and tasks associated with each employee. Information regarding home contact information, education, physical characteristics, health record, or employee benefits also may be included. For each customer, the customer data 366 may include information identifying services or goods generally provided to the customer, delivery or payment preferences, customer contacts, and associated customer locations (e.g., addresses, approximate latitude and longitude).

The enterprise information also may include data 368 from specialized context sensors. For example, the context sensors might include a global positioning system (GPS) which might detect a client device and provide location data (e.g., latitude and longitude) related to the client device. Location data also may be obtained using a beacon emitting signals, such as, radio frequency signals or infrared signals. These signals may be received, for example, by a client. The beacon may broadcast location identifying information, such as, a geographical identifier (e.g., latitude and longitude of the beacon) or an abstract representation of a location (e.g., the street address of the beacon, the name of a store, a numerical identifier). The context sensor data 368 also might include data provided by other context sensors related to temperature, loudness, lighting, a pulse or respiration rate of the user, or a skin conductivity of the user.

The enterprise information also may include for each user a user profile 370. The user profile 370 may include previously determined context information, such as, for example, context information based on the users' most recent accesses to the enterprise service. The user profile may include information stored, for example, in a data repository based on the X.500 directory access standard (e.g., a lightweight directory access protocol (LDAP)). Among other benefits, LDAP allows different kinds of context information to be stored, such as, for example, client and service profiles.

The decision engine 310 includes, for example, a rule engine 315, and/or an inference engine 320. The rule engine 315 may be configured to enable the decision engine 310 to determine the context information 330 by applying one or more rules to the enterprise information 350 accessed by the decision engine 310. Each rule of the rule engine 310 may include a condition and an associated action that is performed or a conclusion that is drawn if the condition is satisfied. The inference engine 320 may be configured to infer the context information 330 from information input to the decision engine 310. The inference engine 320 may employ one or more methods or systems to infer the context information 330 from information accessed by the decision engine 310 that is uncertain, contradictory, or ambiguous. For example, the inference engine 320 may employ Bayesian reasoning, the Dempster-Shafer theory, a knowledge base, an expert system, plan recognition, collaborative filtering, statistical analysis, a neural network, data mining, keyword analysis, fuzzy logic, an overlay model, a bug library, or a combination of one or more of these methods or systems. After determining the context information 330, the decision engine may, for example, update the user profile 370 with the newly determined context information 330.

The context information 330 determined by the decision engine 310 includes at least a user identification 332 of the user accessing the enterprise service, a client identification 334 of the client device used by the user to access the enterprise service, a user role 336 associated with the user, an application expertise 338 of the user related to the enterprise service, and a client expertise 340 of the user related to the client. Nevertheless, the context data 330 may include many additional items of information. For example, the context data 330 may include physical environment information 342 related to a physical environment of the user, such as, for example, time, temperature, lighting, or loudness. The context data 330 also may include physical status information 344 related to a physical status of the user, such as, for example, whether the user is hard of hearing, near-sighted or far-sighted, or whether the user is distracted or nervous.

Referring to FIG. 4, the interface adaptation service 180 may include an adaptation engine 410 configured to access the context information 330 (e.g., directly from the decision engine, or from the user profile 370) and to adapt an interface of a client 430 according to the context information 330. Similarly to the decision engine 310 of the system of FIG. 3, the adaptation engine 410 may include a rule engine 415 or an inference engine 420 that may determine adaptation of the client interface based on the context information 330 accessed by the adaptation engine 410. The inference engine 420 may adapt the user interface even when the context information 330 accessed by the adaptation engine 410 is uncertain, ambiguous or contradictory. The inference engine 420 may employ Bayesian reasoning and/or any of the methods or systems described with respect to the inference engine 320 of FIG. 3, either alone or in combination.

Figure 5:
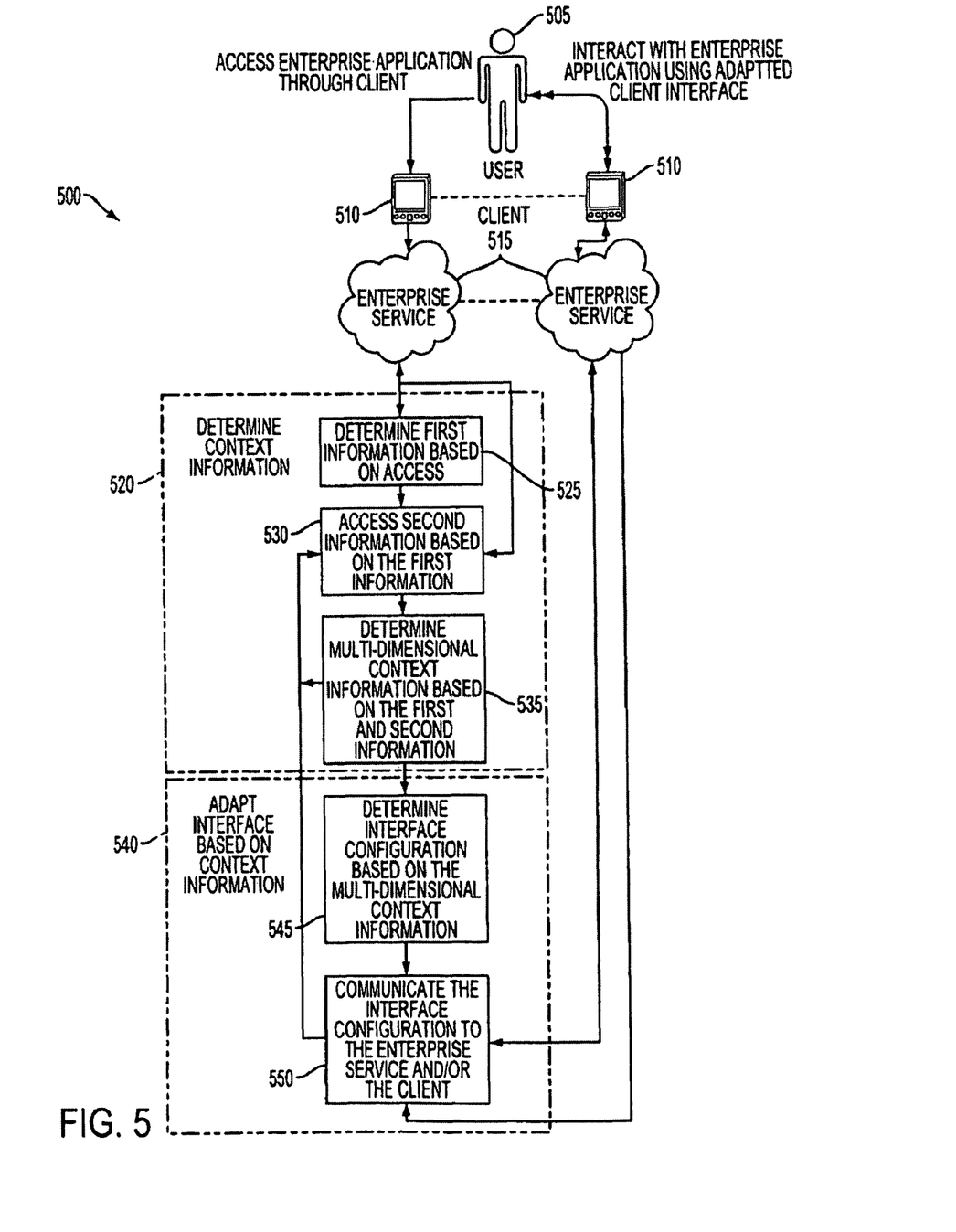
FIG. 5 is a flow diagram illustrating a systematic process implementable by the context adaptation service of FIGS. 1-2.

FIG. 5, illustrates a systematic process 500 implementable by the systems of FIGS. 1-4 to adapt a user interface of a client 510 accessing an enterprise service 515 based upon multi-dimensional context information. Initially, a user 505 may use the client 510 to access the enterprise service 515. The process 500 may respond by identifying multi-dimensional context information (steps 520), and adapting a user interface based on the multi-dimensional context information (steps 540).

Determining the multi-dimensional context information (steps 520) may include, for example, obtaining first information regarding the access or login (e.g. a user identification, a client identification) from the enterprise service (step 525). Based on the first information, second information may be determined, for example, from information sources of the enterprise service (step 530). Based on the first and second information, multi-dimensional context information then may be determined (step 535).

Adapting the interface based on the multi-dimensional context information (steps 540) includes using the multi-dimensional context information to determine an interface adaptation suited to the context information (step 545). The interface configuration also may be based on direct user input, received, for example, by making a query to the user based on an initially determined interface configuration.

More specifically, the interface adaptation may be based, among other things, on an expertise of the user related to the enterprise service 515, or related to the client 510 or interaction scheme. Specifically, a user not familiar with a specific aspect of the enterprise service 515 may need to be instructed regarding what information to enter in information fields associated with that aspect of the enterprise service 515. At the same time, when accessing the enterprise service 515 from a familiar client such as a desk-top computer, the user may require no help to use the screen, keyboard and mouse. On the other hand, the user may access the enterprise service 515 using a client with a fully VoiceXML (voice extensible markup language) enabled interface. In that case, although familiar with the enterprise service 515, the user may need more support with an unfamiliar interaction scheme of the interface (e.g. the interface may advise the user "you can say the number or type into the keyboard"). The interface might also be adapted to hide items expected to be irrelevant to a current task of the user while offering shortcuts to probably needed functions.

After the interface configuration is determined, the context adaptation process 500 may communicate the interface configuration to the client 510 and/or to the enterprise service 515 causing the interface to be adapted (step 550). The user then may interact with the enterprise service 515 through the client 510 using the adapted interface. The context adaptation process 500 may continually determine context and may readapt the user interface based on a changed context. For example, after communicating the interface configuration to the enterprise service and/or the client (step 550), the process 500 may continue to monitor the information sources of the enterprise service (step 530) and determine context information (step 535) to determine if a changed context exists. When a changed context is determined, the process 500 may re-determine the interface configuration (step 545) and communicate the re-determined interface configuration to the enterprise service and/or the client (step 550).

Figure 6A:
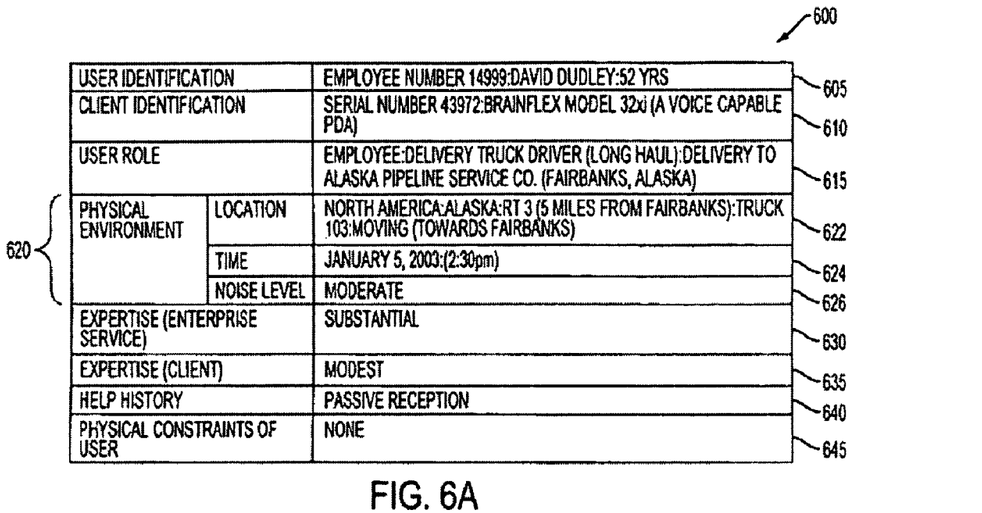
FIG. 6A describes an exemplary multi-dimensional context related to an enterprise system.

FIG. 6A illustrates multi-dimensional context information 600 such as may be determined using the process 500 of FIG. 5. The multi-dimensional context information 600 includes an identification of the user 605 as David Dudley, age 52, with an employee number 14999. The multi-dimensional context information 600 also includes information 610 that identifies the client device used by David Dudley to access the enterprise as a BrainFlex model 32xi voice-capable PDA. User role information 615 identifies David Dudley's role as a company employee, and, more specifically, as a driver of a long haul delivery truck. The user role information 615 further identifies that David Dudley currently is making a delivery to Alyeska Pipeline Service Co. of Fairbanks, Ak.

The multi-dimensional context information 600 also includes information 620 regarding aspects of David Dudley's physical environment. Specifically, it includes information 622 that identifies David Dudley as being in truck 103, 50 miles outside of Fairbanks, Ak., and moving towards that city on Route 3. Information 624 and 626 is included that informs also that the time is 2:30 p.m. on Jan. 5, 2003, and that the background noise in the truck is moderate. David Dudley's expertise with the aspect of the enterprise service he has accessed is shown by information 630 to be substantial while his expertise with the client is identified by information 635 as modest. Context information 640 indicates that David Dudley historically has preferred to take a passive role with respect to accessing help. In other words, he has preferred that he not be required to request the help, but that appropriate help be offered to him. In addition, information 645 identifies no physical constraints associated with David Dudley, such as, for example, hardness of hearing.

Figure 6B:
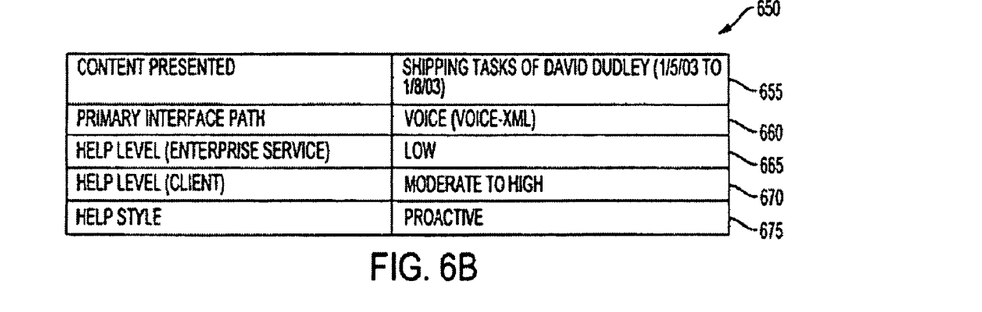
FIG. 6B illustrates an interface adaptation corresponding to the multi-dimensional context information of FIG. 6A.

FIG. 6B illustrates an interface adaptation 650 determined based on the multi-dimensional context information 600 of FIG. 6A. The interface adaptation 650 includes a description 655 of the enterprise service content that the interface will present to David Dudley. In this example, the interface adaptation service has determined from the context information to present to David Dudley information relating to his shipping tasks for a three day period extending from his time of access to the enterprise service.

This decision is based, for example, on David Dudley's role as a long haul delivery truck driver in the middle of a current delivery, and upon the limited interface capabilities of the client PDA. The interface adaptation service may presume that David Dudley will most likely inquire about either his present delivery task, or about a delivery task scheduled for the near future. The interface adaptation service may determine to simplify the interface by limiting the information presented to David Dudley accordingly. Contrary to expectation, however, David Dudley may desire to access employee benefit services, or to view shipping tasks further in the future in order to plan for a vacation. The interface adaptation may allow David Dudley to override its preliminary determination 655 based on his actual rather than expected needs.

Because the context information indicates that David Dudley is driving and that lighting likely is poor (e.g., it is still night in Alaska during the winter at 2:30 p.m.), the interface adaptation 650 may provide 660 that the primary interface path should be voice (e.g. using VoiceXML), thus allowing David Dudley to maintain eye contact with the road. Nevertheless, another primary interface path might be chosen were the context information to indicate that the noise level were high, or that David Dudley were hard of hearing or deaf. For example, another suitable interface path might be available where the delivery truck includes a heads-up display with integrated steering-wheel controls configured to operate with the client PDA. In that case, the heads up display might be selected as the primary interface path in the interface adaptation.

Based on the indication of the context information that David Dudley has substantial expertise with the enterprise service, the interface adaptation 650 may indicate an enterprise help level 665 of "low" that may cause the interface to be streamlined by minimizing the level of help offered regarding use of the enterprise service. On the other hand, the interface adaptation may indicate a client device help level 670 that is "moderate to high," (e.g., the company recently may have replaced a notebook computer on which David Dudley was proficient with the PDA). In that circumstance, the client device help level 670 may cause the user interface to provide a moderate to high level of help with respect to the client PDA.

Finally, the interface adaptation may indicate 675 that help should be offered to David Dudley in a proactive style (e.g., offered when a pause indicates possible user confusion). This determination may be based on the context information showing that David Dudley historically has preferred a passive role in receiving help. The interface adaptation might provide that the help style should be passive (e.g., activated only upon user request) if the context information indicated that David Dudley preferred to refer to help only after having failed himself to determine a solution.

The interface adaptation 650 may be implemented based on an interface or protocol associated with the interface adaptation service, and/or as a data structure. For example, the interface adaptation service may "push" the information of the interface adaptation 650 to the enterprise service or the client device using a suitable protocol. The interface adaptation service also may be configured to populate the information of the interface adaptation 650 into an appropriate data structure. The enterprise service or the client device may then access the information of the interface adaptation 650 by accessing the data structure.

Figure 7A:
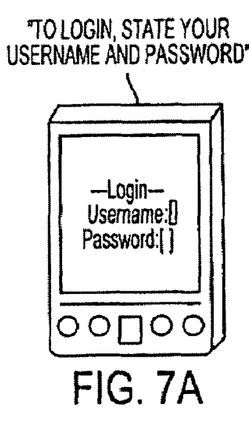
FIGS. 7A-C are exemplary displays illustrating a user interaction with a user interface adapted by the context adaptation service.
Figure 7B:
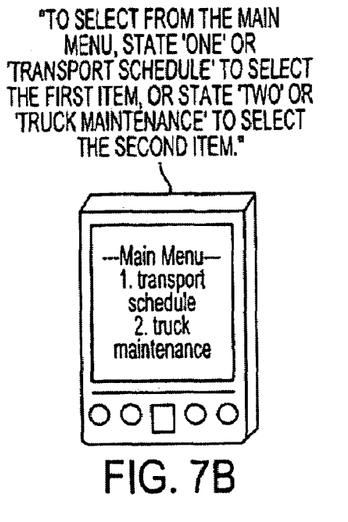
Figure 7C:
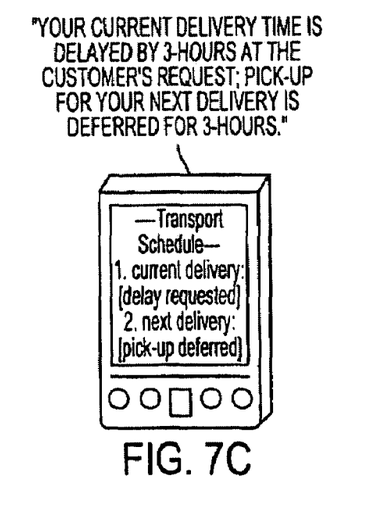

FIGS. 7A-C illustrate an interaction of David Dudley with the client PDA using the adapted interface.

Referring to FIG. 7A, the client PDA initially may await for David Dudley to provide login information or to demonstrate an intent to login. For example, David Dudley might provide login information using a handwriting recognition system of the PDA, through an attached keyboard, or might indicate an intent to login vocally by saying "Login." Upon receiving the verbal command "login," the client PDA might respond: "To login, state your username and password." Alternatively, the client PDA might employ biometrics such as through fingerprinting or a voice scan to provide the needed identification and authentication.

Referring to FIG. 7B, once David Dudley has logged onto the system, the context adaptation service may determine context and adapt the client PDA interface as described above. Based on the interface adaptation, the client PDA may display a main menu offering selections related to David Dudley's immediate and near future tasks as a truck driver. These might include his short term transport schedule, as well as any maintenance scheduled for his truck for the same period. Based on the interface adaptation determination of voice as the primary interface, the client PDA may present the menu information vocally without further prompting by David Dudley. For example, the interface may instruct: "To select from the Main menu, state 'one' or 'transport schedule' to select the first item, or state 'two' or truck maintenance' to select the second item." David Dudley might determine to access the transport schedule and might do so by stating "one."

Referring to FIG. 7C, the client PDA may respond to David Dudley's instruction by indicating through speech that "Your current delivery time is delayed by 3-hours at the customer's request; pick-up for you next delivery is deferred for 3-hours." Similar information also may be provided textually by the client PDA. The textual information displayed by the client PDA may be more limited in view of a more limited display capacity of the PDA. The client PDA may provide an associated on screen text description as shown in FIG. 7C, but may require a user to make an additional selection to provide the more detailed information readily provided using voice.

The context information may be updated to match changing context continuously, periodically, or by any other suitable method. As context information changes in response to changing context, the interface adaptation also may be updated. For example, David Dudley may determine to stop at a diner to eat before reaching Fairbanks, but to continue interacting with the enterprise service while at the diner. The context information may be updated to reflect that David Dudley no is outside of his truck which no longer is moving. Moreover, the noise level in the diner may be high. In view of the changed context, the interface adaptation may indicate that that the primary interface path should be text rather than voice based on the noise level and in order to protect privacy while David Dudley is outside of his truck.

Other implementations are within the scope of the following claims. For example, enterprise process workflows also may be adapted to recognize and respond automatically to complex situations based on multi-dimensional context information. Multi-dimensional context information also may improve user identification and authentication schemes by combining existing enterprise information with, for example, biometric identification of a user.

What is claimed is:

1. An enterprise system with multi-dimensional context awareness, the system comprising:
   an enterprise service coupled to a network, the enterprise service configured to perform at least one enterprise operation based on a user request;
   a client device coupled to the network to access the enterprise service, the client device including a user interface, and being configured to issue the user request; and
   a context adaptation service that communicates with the enterprise service and the client device via the network, the context adaptation service including a context determination service, and an interface adaptation service, wherein:
   the context determination service is configured to determine context information from enterprise information related to the at least one enterprise operation, the context information comprising a user expertise related to user-populated information fields associated with the enterprise service, a user expertise related to user-accessible help with using components of the client device, and a user expertise related to an interaction scheme of the user interface, the interaction scheme related to a mode of data input for the user interface, and the interface adaptation service generates an interface adaptation based on the context information, which is received from the context determination service, determines an interface configuration based on the interface adaptation, and transmits the interface configuration to at least one of the enterprise service and the client device, the enterprise service processing the interface configuration to provide an adapted user interface that is displayed on the client device, the adapted user interface hiding irrelevant items and providing shortcuts to functions and being based on a combination of the user expertise related to the user-populated information fields associated with the enterprise service and the user expertise related to the user-accessible help with using the components of the client device; and the context adaption service is configured to monitor the context information to determine that the context information has changed and to regenerate the interface adaptation based on changed context information.

2. The system of claim 1, wherein the interface adaptation service adapts the user interface of the client device to select a sensory communication path for interaction of the user with the enterprise service suited to a context described by the context information.

3. The system of claim 2 wherein the sensory communication path selected comprises at least one of a voice communication path, a text communication path, and a graphical communication path.

4. The system of claim 1, wherein the interface adaptation service adapts the user interface to adjust a level of help automatically provided to the user regarding operation of at least one of the client device and the enterprise service based on the expertise of the user related to the user-accessible help with using the components of the client device and the user-populated information fields associated with the enterprise service, respectively.

5. The system of claim 1, wherein the interface adaptation service adapts the user interface to present only information to the user relevant to at least one of a user role and a user identification described by the context information.

6. The system of claim 1 wherein the context adaptation service comprises at least one of a rule engine, an inference engine, and a Bayesian reasoning engine.

7. The system of claim 1 further comprising a plurality of information sources that communicate with the network, the plurality of information sources including at least one of a database, a security device, a global positioning system, and an information source configured to provide other information in addition to the context information.

8. The system of claim 1, wherein at least one of the user expertise related to the user-populated information fields associated with the enterprise service and the user expertise related to the user-accessible help with using the components of the client device is based on an activity history of the user.

9. A method of adapting a user interface of a client device in an enterprise system based on multi-dimensional context information, the method comprising:

performing an enterprise operation via an enterprise service that is coupled to a network based on a user request;

issuing the user request from a client device that is coupled to the network, the client device including a user interface;

receiving enterprise information at a context adaptation service that includes a context determination service, and an interface adaptation service;

determining, at the context determination service, context information based on the enterprise information related to the at least one enterprise operation, the context information comprising a user expertise related to user-populated information fields associated with the enterprise service, a user expertise related to user-accessible help with using components of the client device, and a user expertise related to an interaction scheme of the user interface, the interaction scheme related to a mode of data input for the user interface;

generating, at the interface adaptation service, an interface adaptation based on the context information, which is received from the context determination service;

determining, at the interface adaptation service, an interface configuration based on the interface adaptation;

transmitting the interface configuration to at least one of the enterprise service and the client device, the enterprise service processing the interface configuration to provide an adapted user interface that is displayed on the client device, the adapted user interface hiding irrelevant items and providing shortcuts to functions and being based on a combination of the user expertise related to the user-populated information fields associated with the enterprise service and the user expertise related to the user-accessible help with using the components of the client device; and monitoring the context information to determine that the context information has changed and to regenerate the interface adaptation based on changed context information.

10. The method of claim 9, wherein adapting the user interface comprises selecting a sensory communication path for interaction of the user with the enterprise service that is suited to a context described by the context information.

11. The method of claim 10 wherein the sensory communication path selected comprises at least one of a voice communication path, a text communication path, and a graphical communication path.

12. The method of claim 9, wherein adapting the user interface comprises adapting the user interface to adjust a level of help automatically provided to the user regarding operation of the client device based on the expertise of the user related to the user-accessible help with using the components of the client device.

13. The method of claim 9, wherein adapting the user interface comprises adapting the user interface to adjust a level of help automatically provided to the user regarding operation of the enterprise service based on the expertise of the user related to the user-populated information fields associated with the enterprise service.

14. The method of claim 9, wherein adapting the user interface of the client device based on the context information comprises adapting the user interface to present only information to the user relevant to a user role described by the context information.

15. A computer-readable storage medium coupled to one or more processors and having instructions stored thereon that, when executed, operate to cause the one or more processors to:

perform an enterprise operation via an enterprise service that is coupled to a network based on a user request;

issue the user request from a client device that is coupled to the network, the client device including a user interface;

receive enterprise information at a context adaptation service that includes a context determination service, and an interface adaptation service;

determine, at the context determination service, context information based on the enterprise information related to the at least one enterprise operation, the context information comprising a user expertise related to user-populated information fields associated with the enterprise service, a user expertise related to user-accessible help with using components of the client device, and a user expertise related to an interaction scheme of the user interface, the interaction scheme related to a mode of data input for the user interface;

generate, at the interface adaptation service, an interface adaptation based on the context information, which is received from the context determination service;

determine, at the interface adaptation service, an interface configuration based on the interface adaptation; and transmit the interface configuration to at least one of the enterprise service and the client device, the enterprise service processing the interface configuration to provide an adapted user interface that is displayed on the client device, the adapted user interface hiding irrelevant items and providing shortcuts to functions and being based on a combination of the user expertise related to the user-populated information fields associated with the enterprise service and the user expertise related to the user-accessible help with using the components of the client device; and monitor the context information to determine that the context information has changed and to regenerate the interface adaptation based on changed context information.

16. The computer-readable storage medium of claim 15, wherein adapting the user interface comprises selecting a sensory communication path for interaction of the user with the enterprise service that is suited to a context described by the context information.

17. The computer-readable storage medium of claim 16 wherein the sensory communication path selected comprises at least one of a voice communication path, a text communication path, and a graphical communication path.

18. The computer-readable storage medium of claim 15, wherein adapting the user interface comprises adapting the user interface to adjust a level of help automatically provided to the user regarding operation of the client device based on the expertise of the user related to the user-accessible help with using the components of the client device.

19. The computer-readable storage medium of claim 15, wherein adapting the user interface comprises adapting the user interface to adjust a level of help automatically provided to the user regarding operation of the enterprise service based on the expertise of the user related to the user-populated information fields associated with the enterprise service.

20. The computer-readable storage medium of claim 15, wherein adapting the user interface of the client device based on the context information comprises adapting the user interface to present only information to the user relevant to the user role described by the context information.

* * * * *